(12) United States Patent
Davis et al.

(10) Patent No.: US 8,032,909 B2
(45) Date of Patent: Oct. 4, 2011

(54) WATERMARKING AND ELECTRONIC PROGRAM GUIDES

(75) Inventors: Bruce L. Davis, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1461 days.

(21) Appl. No.: 10/172,735

(22) Filed: Jun. 13, 2002

(65) Prior Publication Data
US 2003/0028882 A1  Feb. 6, 2003

Related U.S. Application Data

(60) Provisional application No. 60/303,173, filed on Jul. 5, 2001.

(51) Int. Cl.
G06F 3/00 (2006.01)
(52) U.S. Cl. .............. 725/50; 725/39; 725/58; 386/291; 386/292
(58) Field of Classification Search .............. 725/50, 725/9–21, 39, 58; 386/291, 292
See application file for complete search history.

(56) References Cited

U.S. PATENT DOCUMENTS

| | | | |
|---|---|---|---|
| 3,729,581 A | 4/1973 | Anderson | |
| 3,749,831 A | 7/1973 | Simpkins | |
| 4,547,804 A | 10/1985 | Greenberg | |
| 4,706,121 A | 11/1987 | Young | |
| 4,945,412 A | 7/1990 | Kramer | |
| 5,526,127 A | 6/1996 | Yonetani et al. | |
| 5,559,548 A | 9/1996 | Davis et al. | |
| 5,576,755 A * | 11/1996 | Davis et al. | 725/48 |
| 5,585,838 A * | 12/1996 | Lawler et al. | 725/54 |
| 5,585,866 A | 12/1996 | Miller et al. | |
| 5,589,892 A | 12/1996 | Knee et al. | |
| 5,592,551 A * | 1/1997 | Lett et al. | 380/211 |
| 5,627,655 A | 5/1997 | Okamoto et al. | |
| 5,635,978 A | 6/1997 | Alten et al. | |
| 5,652,613 A * | 7/1997 | Lazarus et al. | 725/50 |
| 5,666,645 A * | 9/1997 | Thomas et al. | 725/47 |
| 5,694,163 A | 12/1997 | Harrison | |
| 5,699,107 A * | 12/1997 | Lawler et al. | 725/58 |
| 5,699,125 A * | 12/1997 | Rzeszewski et al. | 725/50 |
| 5,781,246 A | 7/1998 | Alten et al. | |
| 5,790,198 A * | 8/1998 | Roop et al. | 725/48 |
| 5,801,753 A * | 9/1998 | Eyer et al. | 725/50 |
| 5,805,763 A * | 9/1998 | Lawler et al. | 386/83 |
| 5,822,123 A | 10/1998 | Davis et al. | |
| 5,822,432 A | 10/1998 | Moskowitz | |
| 5,841,433 A * | 11/1998 | Chaney | 725/50 |
| 5,841,978 A | 11/1998 | Rhoads | |
| 5,844,620 A * | 12/1998 | Coleman et al. | 725/54 |
| 5,886,995 A * | 3/1999 | Arsenault et al. | 370/477 |
| 5,923,627 A | 7/1999 | Miwa | |
| 5,956,455 A | 9/1999 | Hennig | |
| 5,961,603 A | 10/1999 | Kunkel | |
| 5,986,650 A | 11/1999 | Ellis et al. | |
| 6,016,141 A | 1/2000 | Knudson et al. | |
| 6,081,830 A | 6/2000 | Schindler | |
| 6,118,492 A | 9/2000 | Milnes et al. | |
| 6,118,923 A | 9/2000 | Rodriguez | |
| 6,122,403 A | 9/2000 | Rhoads | |
| 6,133,909 A | 10/2000 | Schein et al. | |
| 6,141,488 A | 10/2000 | Knudson et al. | |
| 6,144,401 A | 11/2000 | Casement et al. | |
| 6,151,059 A | 11/2000 | Schein et al. | |
| 6,167,188 A | 12/2000 | Young et al. | |
| 6,169,543 B1 * | 1/2001 | Wehmeyer | 725/47 |
| 6,173,112 B1 | 1/2001 | Gruse et al. | |
| 6,177,931 B1 * | 1/2001 | Alexander et al. | 725/52 |
| 6,209,131 B1 * | 3/2001 | Kim et al. | 725/50 |
| 6,215,526 B1 | 4/2001 | Barton et al. | |
| 6,216,228 B1 * | 4/2001 | Chapman et al. | 713/176 |
| 6,216,265 B1 | 4/2001 | Roop et al. | |
| 6,233,389 B1 | 5/2001 | Barton et al. | |
| 6,247,176 B1 | 6/2001 | Schein et al. | |
| 6,263,502 B1 * | 7/2001 | Morrison et al. | 725/47 |
| 6,275,268 B1 | 8/2001 | Ellis et al. | |
| 6,275,648 B1 | 8/2001 | Knudson et al. | |
| 6,278,717 B1 * | 8/2001 | Arsenault et al. | 370/477 |
| 6,310,956 B1 | 10/2001 | Morito | |
| 6,331,877 B1 | 12/2001 | Bennington et al. | |
| 6,341,195 B1 | 1/2002 | Mankovitz et al. | |
| 6,359,580 B1 * | 3/2002 | Morrison | 348/731 |
| 6,363,149 B1 | 3/2002 | Candelore | |
| 6,373,960 B1 | 4/2002 | Conover et al. | |
| 6,389,055 B1 | 5/2002 | August | |
| 6,405,372 B1 * | 6/2002 | Kim et al. | 725/50 |
| 6,418,556 B1 | 7/2002 | Bennington et al. | |
| 6,421,067 B1 * | 7/2002 | Kamen et al. | 715/719 |
| 6,456,725 B1 | 9/2002 | Cox et al. | |
| 6,491,217 B2 | 12/2002 | Catan | |

(Continued)

FOREIGN PATENT DOCUMENTS

EP  954172 A2 * 11/1999

(Continued)

*Primary Examiner* — Brian T Pendleton
*Assistant Examiner* — Nnenna Ekpo

(57) ABSTRACT

Electronic program guide (EPG) information is updated based on watermark data conveyed with video. Such systems permit EPGs to be updated automatically to reflect changes to program scheduling caused by sporting events running long, late breaking news, etc. In one arrangement, a system identifies incoming programming by reference to watermark data, and conforms the EPG presentation to match the incoming programming. The electronic program guide paradigm can also be applied to indexing online messaging forums that are related to video programs, and access to such forums can be provided through use of watermark data.

18 Claims, No Drawings

U.S. PATENT DOCUMENTS

| | | | |
|---|---|---|---|
| 6,505,348 B1* | 1/2003 | Knowles et al. | 725/49 |
| 6,513,069 B1 | 1/2003 | Abato et al. | |
| 6,526,171 B1 | 2/2003 | Furukawa | |
| 6,529,681 B1 | 3/2003 | Ando et al. | |
| 6,532,590 B1* | 3/2003 | Chimoto | 725/43 |
| 6,587,127 B1 | 7/2003 | Leeke et al. | |
| 6,591,292 B1* | 7/2003 | Morrison et al. | 709/206 |
| 6,601,238 B2* | 7/2003 | Morrison et al. | 725/50 |
| 6,604,240 B2 | 8/2003 | Ellis et al. | |
| 6,690,831 B1 | 2/2004 | Kondo | |
| 6,701,062 B1 | 3/2004 | Talstra | |
| 6,701,369 B1 | 3/2004 | Philyaw | |
| 6,701,526 B1* | 3/2004 | Trovato | 725/39 |
| 6,701,528 B1 | 3/2004 | Arsenault et al. | |
| 6,707,465 B2 | 3/2004 | Yamazaki | |
| 6,741,684 B2 | 5/2004 | Kaars | |
| 6,754,905 B2 | 6/2004 | Gordon et al. | |
| 6,756,997 B1* | 6/2004 | Ward et al. | 715/716 |
| 6,768,980 B1 | 7/2004 | Meyer | |
| 6,771,317 B2 | 8/2004 | Ellis et al. | |
| 6,771,885 B1 | 8/2004 | Agnihotri et al. | |
| 6,774,926 B1 | 8/2004 | Ellis et al. | |
| 6,798,893 B1* | 9/2004 | Tanaka | 382/100 |
| 6,802,074 B1 | 10/2004 | Mitsui et al. | |
| 6,834,308 B1 | 12/2004 | Ikezoye et al. | |
| 6,850,252 B1* | 2/2005 | Hoffberg | 715/716 |
| 6,947,571 B1 | 9/2005 | Rhoads et al. | |
| 6,968,566 B1* | 11/2005 | Entwistle | 725/39 |
| 6,971,011 B1* | 11/2005 | Maes | 713/176 |
| 7,080,396 B2* | 7/2006 | Gong | 725/50 |
| 7,178,157 B1 | 2/2007 | Kimura et al. | |
| 7,263,202 B2 | 8/2007 | Davis | |
| 7,697,718 B2 | 4/2010 | Davis et al. | |
| 7,778,441 B2 | 8/2010 | Davis et al. | |
| 2001/0013124 A1 | 8/2001 | Klosterman et al. | |
| 2001/0021916 A1 | 9/2001 | Takai | |
| 2001/0026618 A1 | 10/2001 | Van Wie et al. | |
| 2001/0056577 A1 | 12/2001 | Gordon et al. | |
| 2002/0038457 A1* | 3/2002 | Numata et al. | 725/47 |
| 2002/0056118 A1 | 5/2002 | Hunter et al. | |
| 2002/0057336 A1* | 5/2002 | Gaul et al. | 348/47 |
| 2002/0066111 A1* | 5/2002 | Rodriguez | 725/135 |
| 2002/0073424 A1 | 6/2002 | Ward et al. | |
| 2002/0073427 A1* | 6/2002 | Morrison et al. | 725/50 |
| 2002/0092017 A1 | 7/2002 | Klosterman et al. | |
| 2002/0120925 A1 | 8/2002 | Logan | |
| 2002/0124050 A1 | 9/2002 | Middeljans | |
| 2002/0144265 A1 | 10/2002 | Connelly | |
| 2002/0159752 A1 | 10/2002 | David | |
| 2002/0162118 A1* | 10/2002 | Levy et al. | 725/110 |
| 2002/0165983 A1 | 11/2002 | Gastaldi | |
| 2002/0171686 A1* | 11/2002 | Kamen et al. | 345/850 |
| 2003/0002638 A1 | 1/2003 | Kaars | |
| 2003/0007664 A1 | 1/2003 | Davis | |
| 2003/0028877 A1* | 2/2003 | Everett et al. | 725/39 |
| 2003/0028882 A1 | 2/2003 | Davis et al. | |
| 2003/0093790 A1 | 5/2003 | Logan et al. | |
| 2003/0110490 A1* | 6/2003 | Dew et al. | 725/37 |
| 2003/0110516 A1* | 6/2003 | Chang et al. | 725/136 |
| 2005/0015802 A1* | 1/2005 | Masson | 725/40 |
| 2005/0262542 A1* | 11/2005 | DeWeese et al. | 725/106 |
| 2006/0026636 A1* | 2/2006 | Stark et al. | 725/37 |
| 2007/0186240 A1* | 8/2007 | Ward et al. | 725/42 |
| 2010/0199314 A1 | 8/2010 | Davis et al. | |

FOREIGN PATENT DOCUMENTS

| | | |
|---|---|---|
| WO | WO98/33325 | 7/1998 |
| WO | WO01/01331 | 1/2001 |
| WO | WO01/41056 | 6/2001 |

* cited by examiner

WATERMARKING AND ELECTRONIC PROGRAM GUIDES

RELATED APPLICATION DATA

This non-provisional application claims priority benefit to provisional application 60/303,173, filed Jul. 5, 2001.

Filed on the same day as this application are two companion applications, both claiming priority benefit to application 60/303,173. One is entitled Watermarking to Control Video Recording, Ser. No. 10/172,734. The other is entitled Watermarking to Set Video Usage Permissions, Ser. No. 10/172,733. The present application includes additional disclosure not included in the two companion applications.

FIELD OF THE INVENTION

The present invention relates to digital watermarking, and more particularly relates to application of digital watermarking technology in content delivery and indexing systems, such as Electronic Program Guides (EPGs).

BACKGROUND

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. Nos. 6,122,403 and 6,408,082, and application Ser. No. 09/503,881 (now U.S. Pat. No. 6,614,914), are illustrative of certain watermarking technologies. Watermarking techniques are also taught in the following Philips U.S. Pat. Nos.: 6,252,972, 6,209,092, 6,198,832, 6,157,330, 6,131,161, 6,031,815, 5,940,134, 5,933,798, and 5,873,022.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. Application Ser. No. 09/571,422 (now U.S. Pat. No. 6,947,571) details a number of connected-content applications and techniques.

DETAILED DESCRIPTION

EPGs organize and present (e.g., by time or topic) upcoming video program content. As cable and satellite services increasingly have hundreds of channels, such guides become essential. EPGs are detailed in a variety of patents, including many assigned to Gemstar and StarSight, including U.S. Pat. Nos. 6,216,265, 6,118,492, 6,133,909, 6,144,401, 6,167,188, 6,247,176, 6,151,059.

In typical EPG systems, a service provider (e.g., TV Guide) collects programming information from national, network and local program sources, and compiles it into a database. The database is indexed by geography and delivery source (e.g., Portland Oregon; AT&T Cable). Once a user's location and delivery source is known, the database can be queried to identify programming that is upcoming, e.g., for the next two hours. This data is typically presented in tabular (grid) form on the user's video screen. Advertising and other information may be presented with the EPG data on the screen.

EPG data is presently conveyed to the consumer for display on-screen through "out-of-band" techniques, such as the vertical blanking interval in analog video. Some systems have dedicated channels through which such data is presented.

One drawback of such systems is their reliance on time-of-day as the key by which program schedules are determined. If a sports game runs late, or if breaking news forces an interruption in normal programming, the EPG does not reflect the change.

In accordance with one aspect of the present invention, watermark data identifying a program is decoded from incoming video. This information is then checked against program identification data in the EPG and, if a discrepancy is noted, then a change in the programming is indicated on the displayed EPG. Consider Superbowl Sunday. The EPG database may indicate that a SuperBowl broadcast on channel 2 is scheduled to end at 5:00 p.m. At 5:15, a watermark is decoded from channel 2 and conveys an identifier associated with the SuperBowl, indicating that the SuperBowl program has run past its originally-allotted time. The EPG can update its entry for the Superbowl, extending its ending time to 5:15 (the current time), 5:30 (the next half-hourly interval), or otherwise mark it as changed. Data for subsequent programming on that channel can likewise be treated as changed (e.g., by pushing back all programming 15 minutes, or to the next half-hourly interval, or otherwise), and displayed in the EPG accordingly.

Continuing this scenario, assume the SuperBowl broadcast ends at 5:20. This ending time can be detected by failure to detect the SuperBowl-identifying watermark from program material on channel 2 for a predetermined interval, such as 5 minutes. At 5:30, a new watermark ID is detected—this one corresponding to the program originally scheduled for broadcast at 5:00. In this case, the database can shift by 30 minutes the expected times of the 5:00 program, to 5:30. Viewers who refer to the EPG at 5:35 will thus be presented with a timetable that accurately reflects the currently available programs.

The expected timing of future programs can also be shifted in the EPG database and display, with the service provider deciding how far out in time to continue this shift. Certainly by midnight, for example, the programming would be expected to return to its originally scheduled timing, with some compensating program change (e.g., an abbreviation of the evening news) making up for the SuperBowl overrun.

In some embodiments, the EPG interface presented to the user indicates that programming times for a particular channel are uncertain. In the example just given, for example, a graphical display of a program grid for channel 2 may be highlighted in yellow from 6:00 p.m. until midnight, indicating that a change has made precise air-times uncertain. As each half-hourly slot arrives, however, the detection of a watermark from the video then being sent permits at least the currently-available programming to be accurately displayed. (Of course, a variety of other techniques can be used to indicate schedule uncertainty, other than yellow highlighting. Distinctive text presentation within the grid (e.g., italics), special effects (e.g., flashing text or background color), textual alert messages, and a great variety of other arrangements can be used to alert the viewer to the uncertainty.)

In addition to indicating uncertainty in the program schedule, the EPG presentation can also be altered to indicate that program times have been shifted from their expected values (i.e., certain times, but different). Again, a variety of user interface techniques can be used to signal this fact to viewers (including techniques detailed above).

Many VCRs, and essentially all Personal Video Recorders (PVRs), rely on EPG data to set start and stop times for recording functions. These devices can respond to watermarks, and/or EPG information that is updated by reference to watermarks, to capture the desired program—regardless of program delays.

Assume that the 5:00 program following the SuperBowl on channel 2 is Seinfeld, and the user has earlier specified that Seinfeld (30 minutes) should be recorded. At 5:00, the recording commences. Soon, however, the watermark data reveals that Seinfeld isn't yet playing. Out of abundance of caution, the device may continue to record. Or it may stop after, e.g., a five minute grace period, and try again, re-starting at the next half-hourly interval. Or, after stopping, it may immediately resuming recording if a Seinfeld watermark is detected between 5:05 and 5:30.

If the device does not stop, but records continuously from 5:00 onward, it may continue until 30 minutes after a Seinfeld-identifying watermark is first identified. Thus, if Seinfeld starts at 5:20, the device will continue to record until 5:50 (and optionally for a brief interval after that time). If a Seinfeld watermark isn't detected within a predetermined window, e.g., 90 minutes, of the expected air-time, the recording device may conclude that the Seinfeld broadcast has been canceled (avoiding recording of hours of unwanted programming).

In other embodiments, the stop time for a recording isn't set by reference to EPG data, or by reference to a known interval (e.g., 30 minutes) after a start time. Instead, the device stops only when a watermark identifying a desired program is no longer detected. (Here, as elsewhere, "no longer detected" typically requires absence of detection for a period of several minutes, to account for commercials and other interruptions that may not convey the watermark of the desired program.)

If the recording device began recording at 5:00, it captured part of the Superbowl broadcast. Rather than save this unwanted program material, it may be deleted. In PVRs, and other devices with digital storage, the storage space allocated to the unwanted programming can simply be marked as unused by the desired program, and returned to the pool of available storage. In one such embodiment, recorded programming is discarded until a time a predetermined interval (e.g., 90 seconds) before first detection of the Seinfeld-identifying watermark.

In other arrangements, instead of deleting the non-Seinfeld program, it may be retained in storage. By reference to the updated EPG data, or the watermark, the unwanted programming can be identified as the end of the Superbowl. This information can be logged in the device's index of recorded material, together with an identification of its length, and optionally the start and stop times of the original broadcast. (Other information, such as the location of the Superbowl video data in the device's file structure can also be maintained, but such information is typically transparent to the user.) When a table of recorded contents is presented to the user on-screen, the Superbowl excerpt can be included among the listings—possibly set-off by distinctive UI presentation to indicate that it was an unintended capture. When the user is first presented with this unintended program capture, the system may ask the user whether it should be retained or deleted. The system may have a default option, e.g., that unless the user acts to preserve the accidentally-captured video, it is deleted.

In tape-based systems, if recording started at 5:00, and at 5:25 the watermark corresponding to the recorded program still indicates a non-Seinfeld program, the tape may be automatically rewound to the point where the 5:00 recording commenced. Then, at 5:30, recording can commence anew, on the possibility that Seinfeld has been shifted to the next half-hourly slot and will be properly captured by recording from 5:30 to 6:00.

Apart from accurately presenting program information, and correctly recording desired programs, watermarking can be employed in connection content security and authentication. Consider the delivery of Pay Per View (PPV) content. The PPV content may have usage rules associated with it. These rules may, e.g., disallow recording, or fast forwarding, or rewinding, or pausing, etc. These usage restrictions may be conveyed by out-of-band or virtual channels, such as data transmitted prior to the video program, or during the vertical blanking interval, or in packet headers. In accordance with certain embodiments of the present invention, watermarks are used to represent this information.

For example, a video signal can include a watermark with an eight bit payload. The first bit, if set to "1," can indicate no copying. The second bit, if set to "1," can indicate one copy permitted. The third bit, if set, can indicate pausing is permitted. The fourth bit can correspond to rewind permission, the fifth to fast forward permission, the sixth can indicate that any copy must be made on a certain type of medium (e.g., a local PVR), the seventh can indicate that any copy must be stored in encrypted form, etc. (If copy-once is permitted, the video can be modified during the permitted copying operation to signal that no-more-copies are authorized. This may be done, e.g., by applying a further watermark to the signal.)

In still other embodiments, watermarks can be used in bandwidth optimization strategies to provide augmented information, or programming, to a consumer. Consider a consumer who is interested in motorcycling. This preference may have been specified explicitly by the consumer, or may have been inferred through his behavior (e.g., his observed history of linking to on-line resources relating to motorcycles). The topic of motorcycling may correspond to a particular 16 bit identifier in a subject matter index (allowing 64 thousand subjects). During hours when the PVR is not being actively used, it may scan through all channels looking for material that is coded with the motorcycle subject code (perhaps among several others). If such material is encountered, it is recorded, and a corresponding entry is made in the PVR's local table of contents. When the consumer next uses the device, he can see that a program of potential interest has been recorded.

The same technology can be used with advertising. Advertising can be topically coded to identify the subject matter. If advertising is encountered having the motorcycle subject code, it can be captured and locally stored for possible later display. In this case, the presentation of the advertising can be requested by the user (as with any other recorded program), or the captured advertisement can be inserted in a commercial slot in other video programming (perhaps supplanting another commercial that is not as likely to capture the consumer's interest).

Such encoding of video content with subject-indicating codes is limited by factors such as lengths of the codes, robustness to compression/decompression and other distortion, video degradation, and other factors. In one system, a watermark with an 80 bit payload can be encoded in video, permitting recovery of 5 different content codes every, e.g., 30 seconds. The same content codes can be repeated every 30 seconds. Or, by repeating them less frequently, more codes can be conveyed (e.g., codes 1-5 in time 0-30 seconds; codes 6-10 in time 30-60 seconds, codes 1-5 in time 60-90 seconds, etc.). Of course, this watermark may be overlaid or interleaved together with other watermarks conveying other information.

Instead of conveying absolute subject matter codes, each video excerpt can convey a unique ID that is used to access associated meta data in a data store. The data store may be local (e.g., downloaded to a set-top box periodically), or remote (e.g., at a cable head-end or elsewhere). Thus, a Seinfeld program may have a single code. But when that code is used to access a corresponding database record with meta data, the record may reveal 10 subject matter codes (e.g., comedy, New York City, Jerry Seinfeld, motorcycling, episode 29, episode title, etc.).

Different subject codes (or unique IDs) can be used for different portions of a video program. So a ninety second clip that relates to a motorcycle may be coded to identify this subject matter, without so-coding the remainder of a program. The different portions need not be just temporal portions. Through object segmentation technology, such as is used in MPEG-4, different on-screen objects can be encoded with different watermark identifiers. Thus, a motorcycle in that ninety second clip may be encoded with a watermark indicating its motorcycle subject matter, while a BMW automobile in the same scene may be encoded with a different watermark.

In monitoring program material for desired codes, the consumer device can have a buffer in which the previous 15 seconds of video is always available. Thus, if a desired watermark is detected, video from 15 seconds prior to the detection can be written to long-term storage—to account for possible latency in watermark detection.

In a typical scenario, there may be 100 subject codes for which a consumer's PVR is watching, corresponding to 100 subjects of potential interest to the consumer. As each watermark is detected, it is checked against this list and, if a match is found, the video is captured (including the buffered 15 seconds prior to detection) for later display. If the program material is watermarked with unique IDs instead of literal subject matter codes, the consumer device can query a database for the corresponding subject matter codes, and record the content if a match with one of the 100 profiled subject matter codes is found. In some embodiments the database is maintained remotely, introducing a delay as the decoded codes are sent to the data, and the results relayed back. Other approaches can mitigate this delay. For example, some (or all) of the database can be cached at the consumer premises. Another approach is for the consumer device to periodically send its 100 searched-for subject matter codes to the database, which then returns a list of the Unique ID records for which the consumer device should be on the lookout (i.e., those having the subject matter codes that are searched for).

The watermark detection functions referenced above can take place at various different locations. In some embodiments, detection may take place at a device in the consumer home, such as in one or more of a set-top box, VCR, PVR, television monitor, etc. Information from such detection, in some embodiments, may be related back up the chain of distribution (e.g., a neighborhood distribution node, cable head-end, cable control center, national EPG database provider, etc.) Or the detection can take place at any of the upstream locations. For example, a station through which all AT&T Cable signals destined for subscribers in Multnomah and Clackamas counties in Oregon can monitor all those channels.

In some applications, it is desirable to employ the watermark-based systems detailed above in connection with known prior art techniques. PPV usage data, for example, can be conveyed both in header data associated with encrypted content, as well as by watermark data. One data can be relied upon primarily (e.g., the header data) and, if absent or apparently corrupted, the watermark information can be relied upon instead.

As should be evident from the foregoing, certain embodiments of the invention contemplate that a unique watermark identifier is associated with each video program. The identifier may be generic to a class of programs (e.g., all Seinfeld shows are identified by the same watermark), or each different program may have a different ID. In the latter case, the watermark payload may have plural portions. One portion may ID a family of programs (e.g., Seinfeld episodes), and another portion may convey an ID uniquely identifying a particular program in that family (e.g., episode 88, "The Big Salad").

The watermark identifier can be used to access a corresponding database record where information about the identified program is stored. It may include the date the program was first broadcast (e.g., "Sep. 29, 1994"), a synopsis of the program (e.g., "Jerry dates Newman's ex. George buys Elaine a big salad from the coffee shop, when his girlfriend takes credit for buying it. George lets Elaine know that it was him that bought that salad. Show ends with Kramer driving Gendison's white Ford Bronco down the interstate (ala OJ )"), rights-holder information, digital rights management information, copy control information, links to related programs, links to related merchandise, links to on-line resources including chat rooms and program archives, subject matter classification codes, etc. This database may be stored remotely from the user station, and remotely accessed by the user as necessary. Or some or all of the database and contents can be kept (or mirrored) in a data store at the user's premises (e.g., in a set top box). Such a database can be configured in accordance with a user profile, e.g., specifying the class of programs to be detailed in the local database. Or the remote database can provide the local database with information corresponding to watermark IDs expected to be encountered in the next 7 days (e.g., during early morning hours when system traffic is otherwise low). A local user database can include information provided by the user and not shared with a remote database, including private notes about likes/dislikes, etc. Or information provided by the user (including demographics and viewing habits) can be passed to a remote database. Such personal information in the remote database can be shared with other users, with a cable system operator, with the provider of the annotated database record, etc. The user may receive a fee in some circumstances for sharing such information.

The technology also finds utility in "instant messaging" (IM), chat rooms, and other online messaging applications. A given user may be participating in several IM chat rooms concurrently—each with a different set of one or more other participants. Presently, such sessions are relatively unstructured—there are relatively few tools and technologies to aid users in accessing and/or tracking such discussions.

In-band content watermarking can provide such an aid. Many IM sessions, chat room discussions, and the like, relate to video programming, and often take place during broadcast or other transmission of the video. Thus, for example, a virtual community of viewers who are watching the currently-airing episode of "Friends" may congregate in a chat room to comment to each other about the character Ross, or about other aspects of the unfolding story. The murder mystery "Homicide" may attract users interested in sharing clues and hunches to help solve the murder. Presently, chat room users use indexing services provided by the chat room hosting service to help them locate relevant chat rooms (e.g., a hierarchical tree structure offered by Yahoo or MSN: Television/SitComs/Friends/Ross) in a process independent of the video program itself.

A video program can convey—with it—a listing, e.g., of chat rooms relevant to the program. The conveyed data can comprise links (e.g., computer address data) that can be used to access the associated chat rooms—either with an enhanced television/web browser terminal, or through use of a separate computer device. In some arrangements, the links are pushed to the user premises (e.g., set-top box, television, etc.) from the network or other source. They can be cached at the user premises and used as desired to access and switch between the chat rooms. The pushed data can be continuously updated, e.g., to correspond to topical changes in the video, to correspond to the ten chat rooms then having the highest number of participants, etc. The cache can be updated accordingly. In other arrangements, links themselves are not transmitted with the video. Instead, the video conveys an identifier or address corresponding to the video. Users who wish to locate relevant links can use the identifier or address to access a remote index at which the individual chat rooms are specified.

When the link data is available to the user—whether pushed with the video, or procured through a proactive user query—a computer device (which may be associated with, integrated with, or wholly apart from the video viewing device) uses the link data to access the desired chat room or other relevant session. In some sophisticated arrangements, the viewing device includes a user interface that—in conjunction with a remote control device, voice recognition technology, etc.—presents relevant chat room opportunities on the screen, and allows the user to select among and switch between the presented options. (The opportunities may be presented as icons, titles, excerpts/samples of recent messages, etc.) The chat dialog(s) selected by the user may then appear in a window on the viewing screen, or on a separate device. In less sophisticated arrangements, the link data is communicated to another device, which presents a user interface permitting the user to select among and between the available links. The communication can take various forms. For example, video output may be fed from the video terminal to a personal computer, which decodes the watermarked link data and presents it on a screen. Or the link data may be encoded in the audio transmitted with the video, and an audio detector (using a microphone, or wired to the audio output) may decode the link data, and an associated device may present it for user selection. Or the link data may be encoded in the instantaneous net luminance of the video display, and sensed remotely using a photodiode (technology that is commercialized by Veil Interactive Technologies, and described in U.S. Pat. No. 4,807,031). Or technology commercialized by WavePhore (e.g., as disclosed in U.S. Pat. No. 5,572,247) may similarly be employed to convey the link data from the video terminal to an interactive device. In such cases, the associated interactive device (e.g., a laptop or palmtop) presents the list for user selection, and provides a user interface through which the user participates in the chat room or IM discussions.

In some arrangements, the online messaging does not occur through now-popular internet-hosted communications channels (e.g., Yahoo, MSN), but rather can be a service offered through the closed digital distribution network over which the video programming is distributed. Part of the network bandwidth (either dedicated in frequency band, or multiplexed across several frequency bands) can be allocated to such inter-subscriber messaging.

The online discussions that are identified through such arrangements can be selected in different fashions. The network that distributes the programming can make some or all of the selections. The advertisers supporting the programming can make some or all of the selections. Some or all of the selections may be made through an automated process that searches popular chat room indices (e.g., Yahoo and MSN hierarchical tree indices) and identifies the ten most active chat rooms relevant to a particular program, etc.

By such arrangements, settop boxes or other consumer devices can aggregate relevant online message content, and make it available in association with corresponding video programming.

While it is contemplated that many advantages accrue from implementing such systems using steganographic watermark conveyance of the data within the content, other encoding techniques can be used as needs dictate (e.g., vertical blanking interval; packet headers, etc.).

Still further, the EPG paradigm by which video programming is indexed for consumer convenience can likewise be used for online messaging applications. The same EPG display which identifies that the current NBC programming on channel 8 is "Friends" can also identify a listing of related on-line discussions. Indeed, such a presentation can be part of the user interface through which the links are presented to the user, and the user selects therebetween.

In other arrangements, online message communications are indexed in EPG-like fashion apart from the video program-EPG.

To provide a comprehensive disclosure without unduly lengthening this specification, the patents and applications cited above are incorporated herein by reference.

Having described and illustrated the subject technologies with reference to illustrative embodiments, it should be recognized that the invention is not so limited. For example, it will be recognized that the concepts detailed above can be implemented with various forms of watermarking technologies, and can be advantageously combined in straight-forward fashion with other content-delivery systems. Moreover, it will be recognized that wherever in the prior art that vertical blanking interval-based data communications techniques were used, the same applications may be served instead by conveying such data through in-band video watermarking. Further, it should be recognized that the particular combinations of elements and features in the above-detailed embodi-

We claim:

1. A method comprising:
   automatically decoding, at a plurality of times, in-band digital watermarks associated with transmitted video programs on a channel;
   by reference to the decoded digital watermarks, identifying a video program being transmitted at each of the plurality of times;
   automatically detecting whether the identified video program is being transmitted at a time different than indicated by electronic program guide data;
   if the identified video program is being transmitted at the time different than indicated by the electronic program guide data, automatically updating the electronic program guide data corresponding to the identified video program without human involvement;
   receiving a request to record a desired video program that is scheduled to air after the identified video program; and
   if the time different than indicated by the electronic program guide data occurs a predetermined amount of time after a scheduled air time of the desired video program, determining that the desired video program will not air and ignoring the request to record the desired video program.

2. The method of claim 1, further comprising altering display of an electronic program guide entry corresponding to the identified video program on a display device.

3. The method of claim 2, further comprising changing at least an ending time of a time slot associated with the identified video program.

4. The method of claim 3, further comprising extending the time slot to a current time.

5. The method of claim 3, further comprising extending the time slot to a next thirty minute boundary.

6. The method of claim 2, further comprising extending a time slot associated with the identified video program.

7. The method of claim 1, further comprising altering display of an electronic program guide entry corresponding to the desired video program.

8. The method of claim 1, further comprising changing a format of an electronic program guide entry associated with the identified video program to visually highlight an altered program schedule.

9. The method of claim 2, wherein the altering is effected centrally by a central facility, and further comprising sending altered electronic program guide data sent to plural consumer premises.

10. The method of claim 2, wherein the altering is effected locally by a processor at a consumer premises.

11. The method of claim 2, wherein the altering includes changing electronic program guide data stored in a memory.

12. The method of claim 1, further comprising altering a visible appearance of an electronic program guide entry to indicate uncertainty relative to an earlier schedule.

13. An apparatus comprising:
   a memory in which electronic program guide data for plural video programs is stored;
   a watermark detector for monitoring in-band video watermark information conveyed with a video program; and
   a processor operatively coupled to the memory and to the watermark detector, wherein the processor is configured to:
   identify the video program based at least in part on the monitoring;
   detect whether the identified video program is being transmitted at a time different than indicated by the electronic program guide data;
   if the identified video program is being transmitted at the time different than indicated by the electronic program guide data, automatically updating the electronic program guide data corresponding to the identified video program;
   receive a request to record a desired video program that is scheduled to air after the identified video program; and
   if the time different than indicated by the electronic program guide data occurs a predetermined amount of time after a scheduled air time of the desired video program, determine that the desired video program will not air and ignore the request to record the desired video program.

14. The apparatus of claim 13, wherein the apparatus is integrated into a consumer electronic device at a premises of a consumer.

15. An apparatus comprising:
   means for decoding in-band digital watermarks associated with transmitted video programs on a channel;
   means for identifying a video program being transmitted on the channel based at least in part on the in-band digital watermarks;
   means for detecting whether the identified video program is being transmitted at a time different than indicated by electronic program guide data
   means for automatically updating the electronic program guide data corresponding to the identified video program if the identified video program is being transmitted at the time different than indicated by the electronic program guide data;
   means for receiving a request to record a desired video program that is scheduled to air after the identified video program; and
   means for determining that the desired video program will not air and ignoring the request to record the desired video program if the time different than indicated by the electronic program guide data occurs a predetermined amount of time after a scheduled air time of the desired video program.

16. The apparatus of claim 15, further comprising means for changing at least an ending time of a time slot associated with the identified video program.

17. The apparatus of claim 16, further comprising means for extending the time slot to a next thirty minute boundary.

18. The apparatus of claim 15, further comprising means for altering a visible appearance of an electronic program guide entry to indicate uncertainty relative to an earlier schedule.

* * * * *

UNITED STATES PATENT AND TRADEMARK OFFICE
CERTIFICATE OF CORRECTION

PATENT NO. : 8,032,909 B2  
APPLICATION NO. : 10/172735  
DATED : October 4, 2011  
INVENTOR(S) : Davis et al.

Page 1 of 1

It is certified that error appears in the above-identified patent and that said Letters Patent is hereby corrected as shown below:

Column 10, line 36, in Claim 15, delete "data" and insert -- data; --.

Signed and Sealed this
Seventeenth Day of April, 2012

David J. Kappos
*Director of the United States Patent and Trademark Office*